United States Patent [19]
McTiffin

[11] Patent Number: 5,506,835
[45] Date of Patent: Apr. 9, 1996

[54] TIMING RECOVERY APPARATUS

[75] Inventor: Michael J. McTiffin, Winchester, England

[73] Assignee: Roke Manor Research Limited, Hampshire, England

[21] Appl. No.: 325,498

[22] Filed: Oct. 19, 1994

[30] Foreign Application Priority Data

Dec. 22, 1993 [GB] United Kingdom ............... 9326216

[51] Int. Cl.⁶ .................................................. H04J 3/06
[52] U.S. Cl. ................... 370/17; 370/94.2; 370/105.3; 375/354; 375/356; 375/364
[58] Field of Search .................................. 370/17, 60, 79, 370/100.1, 109, 94.1, 94.2, 102, 103, 105.3; 375/236, 287, 292, 294, 355, 356, 359, 374, 354, 357, 365, 370, 362, 363, 364

[56] References Cited

U.S. PATENT DOCUMENTS

| | | | |
|---|---|---|---|
| 4,698,806 | 10/1987 | Graves et al. ....................... | 370/100.1 |
| 5,260,978 | 1/1993 | Fleischer ................................. | 375/354 |
| 5,287,389 | 2/1994 | Ichibanagase et al. ................. | 375/365 |
| 5,343,502 | 8/1994 | Sato ........................................ | 375/354 |
| 5,396,492 | 3/1995 | Lien ........................................ | 370/60 |

Primary Examiner—Alpus Hsu
Assistant Examiner—Ricky Ngo
Attorney, Agent, or Firm—Hill, Steadman & Simpson

[57] ABSTRACT

A timing recovery apparatus for asynchronous residual time stamping is disclosed. The timing recovery apparatus is placed at the timing domain boundaries for extending the use of synchronous residual time stamping into a new timing domain and for calculating the value indicative of the number of complete source network clock cycles in a predetermined time period which is loaded into a counter. When the counter reaches a predetermined value, a latch connected to a further counter contains a new residual time stamp value.

3 Claims, 1 Drawing Sheet

TIMING RECOVERY APPARATUS

BACKGROUND OF THE INVENTION

1. Field of the Invention

The present invention relates generally to the field of timing recovery apparatus, and, more particularly, the present invention relates to a synchronous residual time stamping timing recovery apparatus.

2. Description of the Related Art

In asynchronous transmission mode (ATM) networks, the data to be transmitted over the network is subdivided into small packets of data called cells. Statistical multiplexing techniques are used to transmit cells over the network links within the network. One result of statistical multiplexing is that the delay experienced by individual cells varies, and it is not possible to transfer timing information directly over the ATM network within the ATM layer.

Isochronous services are those in which the signal timing at the receive end should be the same as that at the transmit end. In the general case, the source timing of such services will be independent of the ATM network timing. When isochronous connections are carried over ATM networks, special measures are required in order to reproduce the source timing at the destination. If no such measures are taken, the lack of synchronization of the end clocks will lead to cell slip and the information will be corrupted.

The Telecommunications Standardization Sector (TSS) of the International Telecommunications Union are in the process of specifying methods for performing timing recovery for isochronous connections and two techniques have been identified: adaptive clock and synchronous residual time stamp recovery. Using the former technique, the destination clock is regulated so that the information sent to the user has the same average rate as the information arriving over the network. This solution, however, results in wander. Synchronous residual time stamping transfers definitive timing information over the network by reference to a common network clock which must be present at both the source and the destination. This requirement means that without modification, synchronous residual time stamping cannot be used on connections between terminals dependent on different network clocks. Thus, it is not generally applicable to connections between different telecommunications operators nor on connections to private ATM networks nor ATM local area networks (LANs) which are not synchronized to the public network.

An object of the present invention is therefore to provide apparatus by which the synchronous residual time stamping technique can be used between networks which are dependent on different network clocks.

Other objects and advantages of the present invention will be apparent from the following description of the drawings and detailed description of the invention.

SUMMARY OF THE INVENTION

In the present invention, a timing recovery apparatus comprises first and second reference signal sources, first and second dividing means for scaling the first and second reference signal sources, first counter means connected to an output of said second dividing means and storing means having an input connected to an output from said first counter means, second counter means connected to an output of the first dividing means and to a further input of said storing means, and calculation means arranged to calculate a value indicative of the number of complete source network cycles in a predetermined time period which is loaded into the second counter means when a cell sequence count reaches a predetermined value and when the second counter means reaches a predetermined value. The contents of the storing means represents a new residual time step value.

Additional features and advantages of the present invention are described in, and will be apparent from, the detailed description of the presently preferred embodiments and from the drawings.

DETAILED DESCRIPTION OF THE PRESENTLY PREFERRED EMBODIMENTS

ATM cells consist of forty-eight octets of information field and five octets of header. Part of the header field defines the connection to which a particular cell belongs. The structure of the information field is defined by the version of ATM adaptation layer (AAL) used. This varies depending upon the nature of the service being carried. Currently, AAL 1 is specified for isochronous services only and the structure of the information is such that one of the octets of the information field is used for control purposes. These include a three-bit cell sequence count and a field for the transfer synchronous residual time stamping information. The latter is carried as the residual time stamp which is transported as p bits ($0 \leq p \leq 4$) over eight ATM cells (numbered sequentially 0 to 7) on the same network connection.

In essence, the synchronous residual time stamping technique transfers user source timing information over the network as follows. The AAL 1 function at the source informs the AAL 1 function at the destination of the number of network clock cycles that occur while the source delivers a known number of bits to the network. However, since the nominal service rate is known at both ends, the amount of information to be transferred over the network can be reduced to that relating to departures of the source clock from the nominal value, as described in CCITT Draft Recommendation I.363 "B-ISDN ATM Adaptation Layer (AAL) Specification", COM XVIII-R116, July 1992; and, Lay R. C. and Fleischer P. E. "Synchronous Techniques for Timing Recovery in BISDN", GLOBECOM 1992, at page 814 (1993); incorporated herein by reference. Such departures are limited by the required stability of the source clock. In fact, because complete clock cycles are used with consequent rounding, the nominal rate is slightly different from the theoretical and the information passed over the network reflects this timing process as well.

The timing information is passed in the residual time stamp field which is repeated every eight ATM cells. Thus, the timing duration used is the length of time it takes for the source to generate the number of bits to be carried in eight ATM cells. To keep the ratio of the network clock and the source clock within bounds, the network clock is divided down as needed.

Figure 1:
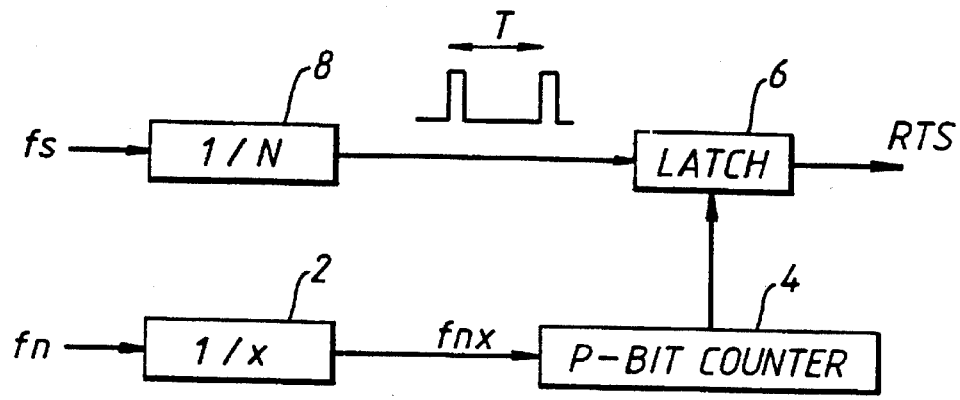
FIG. 1 illustrates a block diagram of a prior art, timing recovery apparatus.

With reference to FIG. 1, which is reproduced from the CCITT Draft Rec. I.363, the network clock ($f_n$) is divided down (by x) by divider circuit 2 and is used to clock a p-bit counter 4. The output of the counter is latched by a latch circuit 6 with a period T which is the time it takes to fill eight ATM cells. The period T is derived from the source clock ($F_s$) divided by the number of user bits in eight cells (N) by divider circuit 8. The latched value of the counter is the residual time stamp value.

In one exemplary application, the following set of values have been specified:

N=3008

1<fx/$f_s$≦2 service clock tolerance 200*10$^{-6}$

Size of residual time stamp four bits (p=4)

When a connection passes across the boundary between timing domains, the two networks (or parts of the networks) involved will be dependent on different timing sources. The residual time stamp value can be recalculated at the interworking point so that in a new network it is based on the new network timing. This is achieved by the apparatus illustrated in FIG. 2.

Figure 2:
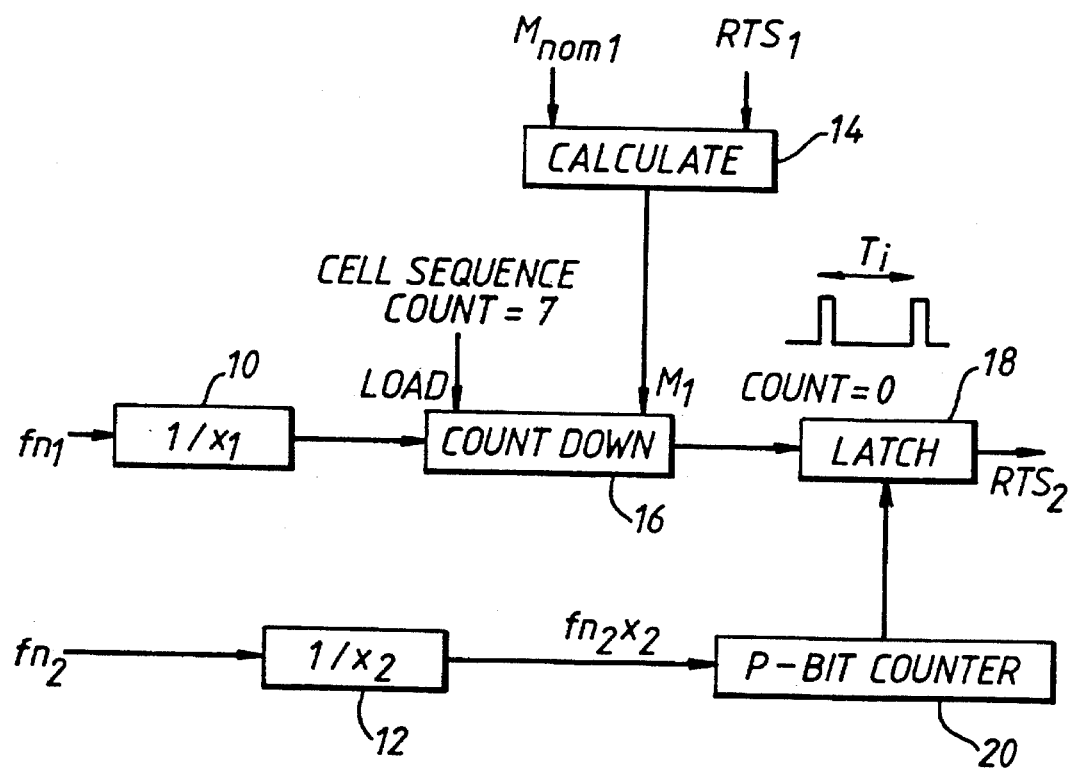
FIG. 2 illustrates a block diagram of a timing recovery apparatus according to the present invention.

In FIG. 1, the period T was generated with respect to the source clock frequency ($f_s$) and a fixed number of bits (N). In FIG. 2, the period $T_i$ (which is nominally equal to T) is now derived by a reference to the frequency of the clock of the source network ($f_{n1}$) and the number of complete source network clock cycles in time T ($M_1$). A method of deriving the value of $M_1$ is shown below. The source $f_{n1}$ is divided by $X_1$ by divider circuit 10, and the source $f_{n2}$ is divided by $X_2$ by divider circuit 12.

A complete residual time stamp value will have been received each time the cell sequence count in the AAL 1 control field reaches seven. The new value of $M_1$ is then calculated by the circuit 14 and is loaded into the countdown counter 16. When the count reaches zero, the value in the latch circuit 18 represents the current value of the p-bit counter 20 and is the residual time stamp value.

One method for calculating the rth value of $M_1$ is given below:

$$M_{1r} = M_{nom} + y_r, \text{ where } M_{nom} = \text{an integer part of } \frac{f_n x_1}{f_s} \cdot N$$

and $y_r$=RTS$_r$−RTS$_{r-1}$−{$M_{nom}$}modulo $2^p \pm n \cdot 2^p$, n integer such that $-2^{p-1} < y_r < 2^{p-1}$ It will be appreciated by those skilled in the art that the benefit of providing residual time stamp interworking is that isochronous services can continue to use synchronous residual time stamping even when they are extended into parts of the network which are not synchronized to the source network. Thus it will reduce the wander experienced by the receiving terminal. It will also be appreciated that the invention may be used in the ATM private networks or ATM LANs which are not synchronized to the public network. This is likely to be especially true in the early use of the ATM public networks where there is likely to be an installed based of ATM LANs with their own timing. The use of the above timing recovery apparatus could ease the problems of handling isochronous connections to such networks.

The present invention is subject to many variations, modifications and changes in detail. It is intended that all matter described throughout the specification and shown in the accompanying drawings be considered illustrative only. Accordingly, it is intended that the invention be limited only by the spirit and scope of the appended claims.

We claim:

1. A timing recovery apparatus comprising:

first and second reference signal sources;

first and second dividing means for scaling the respective first and second reference signals;

a first counter means connected to an output of the second dividing means;

a storing means having a first input connected to an output from the first counter means;

a second counter means connected to an output of the first dividing means and having an output connected to a second input of the storing means;

a calculation means for calculating a value equal to a complete number of source network clock cycles divided by a predetermined integer value which is loaded into the second counter means when a cell sequence count reaches a first predetermined value, and when the second counter means reaches a second predetermined value the contents of the storing means represents a new residual time stamp value, wherein the value calculated by the calculation means is $$M_{1r} = M_{nom} + y_r, \text{ where } M_{nom} = \text{an integer part of } \frac{f_n x_1}{f_s} \cdot N$$

and $y_r$=RTS$_r$−RTS$_{r-1}$−{$M_{nom}$}modulo $2^p \pm n \cdot 2^p$, n integer such that $-2^{p-1} < y_r < 2^{p-1}$ where:

$M_1$ is the value calculated by the calculation means;

$M_{1r}$ is the value of $M_1$ after the rth iteration of the calculation;

N is the number of bits of user data carried in 8 successive ATM cells;

$f_n X_1$ is a source network clock frequency of said source divided by a predefined value;

$M_{nom}$ is the number of complete clock pulses at the frequency $fn_1 x_1$ in the time it takes to generate N clock pulses at the source clock rate;

$y_r$ is the difference between $M_{nom}$ and the actual number of network clock pulses as indicated by the Residual Time Stamp values;

$f_s$ is the frequency of the source clock;

RTS is the RTS value derived from the incoming ATM cell stream in accordance with CCITT Draft Recommendation I.363;

RTS$_r$ is the rth value of the RTS value;

P is the length (in bits) of the first counter means.

2. The timing recovery apparatus of claim 1, wherein the second counter means is a count-down counter which is loaded with the calculated value of the calculation means when a cell sequence count equals seven.

3. The timing recovery apparatus of claim 1, wherein the predetermined value of the second counter means is zero.

* * * * *